United States Patent Office 2,733,985
Patented Feb. 7, 1956

2,733,985
NON-AGGLOMERATING SULPHUR AND METHOD OF PREPARING THE SAME

Maurice J. O'Connor, Chicago, Ill., assignor to O'Connor and Company, Chicago, Ill., a corporation of Delaware No Drawing. Application November 9, 1954, Serial No. 467,889

4 Claims. (Cl. 23—224)

This invention relates to firmly divided sulphur such as is used, for example, as an insecticide, in dusting crops, and for various other purposes, and to a method of preparing the same.

It is known in the art that finely divided sulphur is useful for many purposes, including its use as insecticide in the dusting of crops, and in numerous other ways, but certain problems have been encountered in such uses of finely divided sulphur. Thus, for example, if the sulphur is ground any finer than 200 mesh it causes balling or agglomeration of the sulphur particles with the net result that the sulphur product is lumpy and agglomerated and generally unsatisfactory for its intended uses in the dusting of crops and the like.

In order to overcome the foregoing and other objectionable features of finely divided sulphur it has been customary heretofore to add to such finely divided sulphurs other substances such, for example, as magnesium carbonate, treated clays, channel carbon blacks, etc., to obtain the better dispersion and to prevent the formation of agglomerates therein which is a direct function of the surface area of the particles of the inert material thus added to the finely ground sulphur.

Accordingly, an object of the present invention is to provide a new and improved finely divided sulphur which is substantially free of agglomerates and of any tendency to balling, and which may be packaged and stored for long periods of time without forming balling or the formation of agglomerates, and to provide a novel method of preparing such non-agglomerating sulphur.

Another object of the invention is to provide a free flowing sulphur which is particularly adapted for use in crop dusting and as a readily dispersible sulphur in rubber compounding and for other purposes wherever a finely divided non-agglomerating sulphur may be used.

In the practices of the present invention I incorporate in the finely divided sulphur, which may be any suitable mesh, such, for example, as 200 mesh, from 2 to 10 per cent, by weight, of finely divided or micronized oyster shell which I have found improves the sulphur and prevents its tendency to agglomerate or ball while, at the same time, enabling it to be stored in packaged form and to be stored indefinitely without agglomerating while, at the same time the pH of the micronized oyster shell material is 7.0 for all practical purposes, so that the addition of the finely divided oyster shell to the finely divided sulphur has no chemical effect on the resultant product.

Thus, in the practice of the present invention, I may incorporate in and distribute uniformly throughout the finely divided sulphur, of suitable mesh, from 2 to 10 per cent of finely divided micronized oyster shell material bearing the composition set forth in the following example in which all parts indicated are by weight:

Example No. 1

| | Parts by weight |
|---|---|
| $CaCO_3$ | 98.40 |
| $MgCO_3$ | 0.50 |
| $Al_2O_3$ | 0.10 |
| $SiO_2$ | 0.20 |
| $Fe_2O_3$ | 0.05 |
| Mn | 0.023 |
| Organic material (calculated as $CO_2$) | 0.40 |
| Moisture | 0.20 |
| Copper | None |
| Mica | None |

The physical constants of the finely divided micronized oyster shell material referred to in the foregoing example are as follows:

| | |
|---|---|
| Average particle size | 1.2 microns. |
| Texture | Very soft. |
| Particle shape | Elongated flake. |
| Hardness | 3 (scale). |
| Solubility in $H_2$ | Less than 0.1 per cent. |
| Free alkali (calculated as CaO) | Less than 0.1 per cent. |
| Specific gravity | 2.7. |
| Index of refraction | 1.658. |
| Apparent density | 58 lbs. per cu. ft. |
| Surface area | 6 $M^2$/gm. |
| pH | 7.6. |

The composition of the aforesaid finely divided micronized oyster shell material is as set forth in the following example in which all parts indicated are by weight:

Example No. 2

| | Parts by weight |
|---|---|
| Silica | 0.24 |
| Alumina | 0.13 |
| Ferric oxide | 0.051 |
| Sulphuric anhydride | 0.28 |
| Calcium oxide | 54.57 |
| Carbon dioxide | 43.80 |
| Manganous oxide | 0.023 |
| Sodium oxide | 0.39 |
| Potassium oxide | 0.02 |
| Chlorine | 0.021 |
| Fluorine | [1] 76 |
| Iodine | [1] 300 |

[1] Parts per million.

The particles of the aforesaid finely divided micronized oyster shell material, when ground, milled or otherwise reduced in size, have a flat plate-like shape, and it has been found that this is the only known method of producing a relatively pure calcium carbonate having a plate-like, flake, micaceous or lamellar particle formation, since all other known available sources of calcium carbonate are limestone of varying degrees of purity all of which have a rhombohedral particle shape, formation, or are precipitated or chemically produced calcium carbonate having an acicula-shaped particle.

It will thus be seen from the foregoing description that the present invention provides a new and improved non-agglomerating finely divided sulphur having the desirable advantages and characteristics and accomplishing its intended objects including those hereinbefore pointed out and others which are inherent in the invention.

I claim:

1. Finely divided sulphur having incorporated therein finely divided oyster shell, said finely divided oyster shell being in the form of flat, plate-like lamellar particles.

2. Finely divided non-agglomerating sulphur having incorporated therein as an anti-agglomerating agent, from 2 to 10 per cent, by weight, of finely divided oyster shell, said finely divided oyster shell being in the form of elongated, flat, plate-like lamellar particles.

3. In the art of preparing finely divided, non-agglomerating sulphur, the improvement which resides in incorporating therein and distributing uniformly therethrough finely divided oyster shell in the form of flat, plate-like lamellar particles.

4. In the art of preparing finely divided sulphur, the improvement which resides in incorporating therein from 2 to 10 per cent, by weight, of finely divided oyster shell in the form of elongated, flat, plate-like lamellar particles.

References Cited in the file of this patent

UNITED STATES PATENTS 2,207,737     Hooft et al. _____ July 16, 1940

OTHER REFERENCES

Hough et al.: "Spraying, Dusting and Fumigating of Plants," 1951, The McMillan Co., N. Y., pages 119–120.